Sept. 9, 1952 W. R. ISOM 2,609,724
SHUTTER FOR MOTION-PICTURE PROJECTORS
Filed Aug. 20, 1948

INVENTOR.
Warren. R. Isom
BY
ATTORNEY.

Patented Sept. 9, 1952

2,609,724

UNITED STATES PATENT OFFICE 2,609,724

SHUTTER FOR MOTION-PICTURE PROJECTORS

Warren R. Isom, West Collingswood, N. J., assignor to Radio Corporation of America, a corporation of Delaware Application August 20, 1948, Serial No. 45,303

4 Claims. (Cl. 88—19.3)

1

This invention relates to motion picture apparatus, and particularly to the shutter used in projectors of motion pictures.

It is well-known that various shapes and sizes of light interrupting shutters have been used in the projection of motion pictures, some projectors using two shutters rotating in opposite directions. In 16 millimeter film projectors, there is an inherent non-uniformity of illumination on the screens produced by the incandescent light sources, and, when non-cylindrical blades are employed, there are light flicker beats. The present type of shutter provides for uniformity of darkness on the screen at the time of the first film movement at the beginning of the film advancing cycle and provides for the same uniformity of darkness at the time of the last film movement at the end of the cycle. It also eliminates the above mentioned light flicker.

To avoid the greatest freedom from travel ghost with the greatest possible shutter efficiency, a three-bladed shutter is used, the leading edge of the cover blade being parallel to the horizontal axis of the aperture at the time of the first film movement and the trailing edge being parallel to the horizontal axis of the aperture at the time of the last film movement. Flicker beats are avoided by removing certain portions of the interrupter blades, as will be explained and described hereinafter.

The principal object of the invention, therefore, is to facilitate the projection of motion picture film, particularly 16 millimeter film.

Another object of the invention is to provide an improved light shutter for a motion picture projector.

A further object of the invention is to provide an improved system for interrupting the light during the projection of 16 millimeter motion picture film.

Although the novel features which are believed to be characteristic of this invention will be pointed out with particularity in the appended claims, the manner of its organization and the mode of its operation will be better understood by referring to the following description read in conjunction with the accompanying drawings, forming a part hereof, in which:

2

Figure 5:
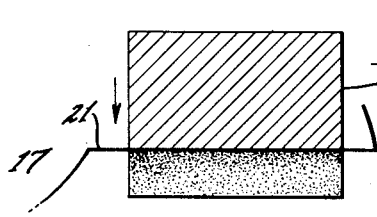
Figure 6:
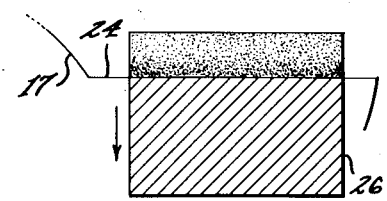

Figs. 5 and 6 are detailed views showing desirable shutter actions at the aperture.

Figure 1:
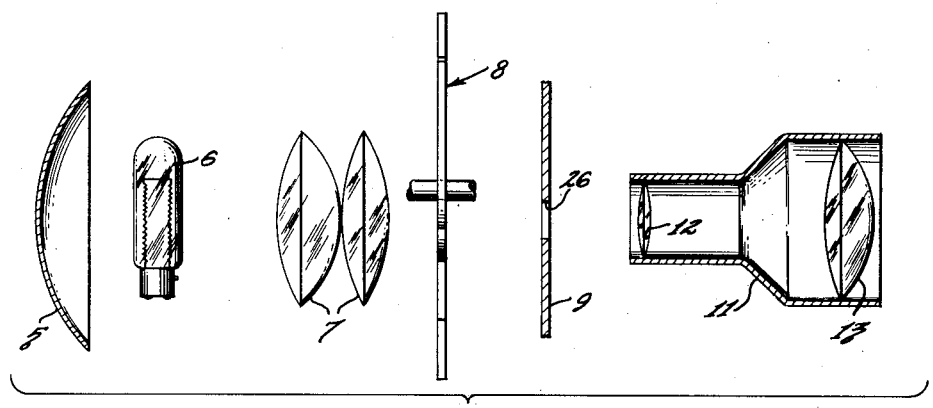
Figure 1 is a general diagrammatic view of the principal elements of a motion picture projector.

Referring now to the drawings, Fig. 1 shows a reflector 5, a lamp 6 having bi-plane filaments, condenser lenses 7, a shutter 8 embodying the invention, film projection aperture plate 9 with aperture 26 therein, and a projection lens objective 11 having lenses 12 and 13. The shutter 8 is not located in the focal plane, since the aperture is in this plane, but it is near enough to the focal plane to act somewhat as a focal plane shutter, and thus, provide a "variable area" effect. Furthermore, the shutter is not far enough removed from the focal plane to act as a pure iris shutter, and thus, provides a "variable density" effect. Thus, the shutter provides both "variable area" and "variable density" effects, which are taken cognizance of in the design of the final shutter shape. In a practical design, the aperture was .284 x .386 inch, and was located ¾ inch ahead of the shutter 8 and 3 inches ahead of the light source 6. The lenses 7 have an F number of 1.6, and the size of the light beam at the aperture was .625 inch by .850 inch.

It has been common practice for a long time, in the design of motion picture projectors, to employ additional blades on the shutters to raise the flicker frequency to a tolerable rate, which has caused the loss of shutter efficiency, particularly when the projection rate is at 16 frames per second. It has also been found that, in projectors employing bi-plane incandescent light sources, one side of the screen is illuminated to a lesser extent when the lamp is adjusted in relation to the optical elements to give the greatest number of lumens on the screen. The present shutter design increases the shutter efficiency and makes uniform the brightness of the screen from side to side without introducing any flicker beat perceptible to the eye.

Figure 2:
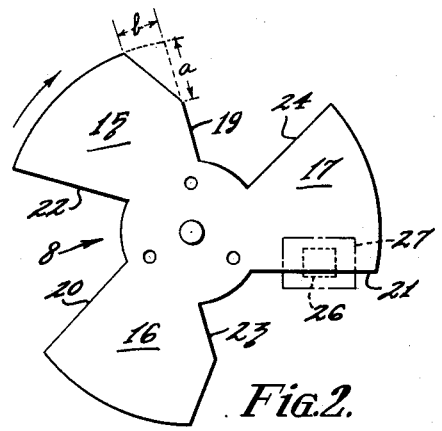
Figs. 2 and 3 are elevational views showing the shutter used in Fig. 1 and embodying the invention in two different rotational positions.
Figure 3:
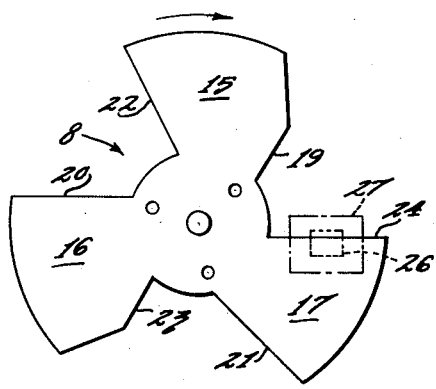

Referring now to Figs. 2 and 3, it will be noted that two interrupter blades have had portions thereof removed. That is, the leading edge of the first interrupter blade 15 has been removed along a line substantially parallel to the trailing edge, and intersecting the former leading edge of the blade at approximately mid-way along its length. The portion of blade 15 removed is shown by dotted line portions a and b. Also, the trailing edge of the second interrupter blade 16, has had a similar portion removed. The light beam is shown at 27. The amounts of the interrupter blades removed are determined by the screen brightness; that is, the less luminous side of the screen should be equal to the brightness of the center, the center brightness being used as the limit of correction to avoid a flicker beat. In this manner, the general illumination of the entire screen is somewhat improved to the extent that the shutter is a "variable density" one, the correction being accomplished, however, because the shutter also operates as a "variable area" shutter. The cover blade is indicated at 17.

The diameter of a preferred shutter is 4⅜ inches, and the width of the blades is 70°. The leading edges 19, 20, and 21 of the blades are on lines tangent to a 1/16 inch circle, whose center is coincident with the axis of rotation of the shutter, and the trailing edges 22, 23, and 24 are on lines tangent to a 5/32 inch circle concentric with respect to said first circle.

In a three-bladed shutter type having two interrupter blades 15 and 16 with portions removed as just described, and cover blade 17, a forty-eight cycle flicker is impressed upon a seventy-two cycle one at a projection rate of twenty-four frames per second and a thirty-two cycle flicker is impressed on a forty-eight cycle one at a projection rate of sixteen frames per second. The phase relationship of these frequencies are such that if the amplitude of the secondary one is governed by the limit explained above, no flicker beat will be perceptible. Thus, the flicker beats are avoided by limiting the amplitude of the correcting frequency, and second, by directing the correction at the part of the screen where it can be shielded successfully from the bright center light. The invention could also be used, if necessary, to correct both sides of the screen.

The relationship that exists between visual and audible perception has been known for years and has been exploited in color organs. Variations in frequencies are much more easily detected than variations in amplitude, particularly when they are of the same order of magnitude on a percentage basis. The manner in which the lower frequency is impressed upon the higher results in little, if any, variation in frequency of the light impulses, and, although the amplitude is increased, this is not as perceptible as frequency changes. However, increase in amplitude is directed almost entirely at the less luminous side of the screen. Furthermore, the center of the screen is the center of attraction, and what is happening on one side is not so apt to be noticed. Also, when the center is the most luminous part of the screen, the eye is again focused to this area, which shields any flicker beat which might be present at the side.

Another feature of the invention is in the shape of the cover blade 17 for controlling the uniformity of darkness of the screen at the time of the first and last motion of the film at the beginning and end, respectively, of the film advancing cycle. This permits the highest degree of shutter efficiency without the fault of travel ghost appearing on any part of the screen. It has been known for some time that the first motion of the film can take place before the screen is totally dark. Likewise, the last motion of the film can take place after the re-illumination of the screen has begun, as long as these motions occur while the screen still appears to be dark to the eye of the observer. The standard observing distance for travel ghost is at least two screen widths distance from a properly illuminated screen. This ratio was used as the limiting factor for the amount of light tolerable at the time of the first and last motion of the film advancing cycle. Since the shutter is used as a combination "variable density-variable area" type, only the portion of the screen not affected by the "variable area" action is subject to this consideration.

Figure 4:
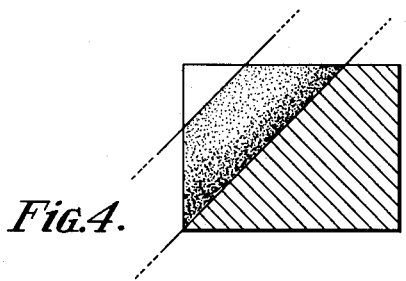
Fig. 4 shows an undesirable shutter action over an aperture.

It has been found that, in order to gain the greatest freedom from travel ghost and enjoy the greatest possible shutter efficiency, it is necessary to have the leading edge of the cover blade 17 parallel to the horizontal axis of the aperture at the time of the first motion of the film and the trailing edge of this blade parallel to the horizontal axis of the aperture at the time of the last motion of the film. This is shown in Figs. 5 and 6, where the leading edge 21 is shown over substantially three-fourths of the aperture 26 with the blade traveling in the direction of the arrow, and the trailing edge 24 over a similar amount of the aperture during the last motion of the film. The cross-hatched area is darkened by the "variable area" action of the shutter, while the graduated stippled area is dimmed by the "variable density" action. If the edges of the cover plate were not so arranged, the undesirable effect shown in Fig. 4 would be produced. The boundary between the area which is dimmed sufficiently to permit motion and that where travel ghost is easily observed is not a clean-cut line, but there is a portion of the aperture beyond the penumbra effect of the "variable density" action of the shutter. By taking advantage of this effect, it is possible to increase the shutter efficiency to its maximum consistent with the time devoted to the total film advancing cycle.

I claim:

1. A motion picture projector shutter system comprising a shaft, a cover blade mounted on said shaft, an optical system, a picture film aperture plate having an aperture therein in which a film is adapted to be intermittently positioned, said shutter blade being located beyond the focal plane of said optical system to provide both variable area and variable density effects at said aperture, said cover blade having its leading edge substantially parallel with the axis of said aperture to actually cover substantially three-fourths of said aperture and provide a penumbra shadow over the remaining portion of said aperture at the time of the first movement of said film from said aperture, and having its trailing edge substantially parallel with the axis of said aperture when said edge passes said aperture to actually cover substantially three-fourths of said aperture different from said first mentioned portion and provide a penumbra shadow over the remaining portion of said aperture at the time of the last movement of said film into said aperture.

2. A motion picture projector shutter system in accordance with claim 1, in which a pair of light interrupter blades are mounted on said shaft, each of said interrupter blades being substantially 120 degrees from said cover blade.

3. A motion picture projector shutter system in accordance with claim 1, in which each of a pair of light interrupter blades are mounted on said shaft substantially 120 degrees from said cover blade, a portion of the tip of the leading edge portion of the first interrupter blade and a portion of the tip of the trailing edge portion of the second interrupter blade being removed, said portions being spaced approximately 180 degrees apart.

4. A motion picture projector shutter system in accordance with claim 3, in which the leading edge of said tip portion of said first interrupter blade is substantially at right angles to the trailing edge of said tip portion of said second interrupter blade.

WARREN R. ISOM.

REFERENCES CITED

The following references are of record in the file of this patent:

UNITED STATES PATENTS

| Number | Name | Date |
|---|---|---|
| 924,147 | Curtiss | June 6, 1909 |
| 1,138,360 | Edison | May 4, 1915 |
| 1,233,816 | Smith | July 17, 1917 |
| 1,375,375 | Frist | Apr. 19, 1921 |
| 1,426,722 | Evans | Aug. 22, 1922 |
| 1,684,968 | Owens | Sept. 18, 1928 |
| 1,749,154 | Hagen et al. | Mar. 4, 1930 |
| 2,027,520 | Diebel | Jan. 14, 1936 |
| 2,068,259 | Berggren | Jan. 19, 1937 |

FOREIGN PATENTS

| Number | Country | Date |
|---|---|---|
| 233,226 | Germany | June 23, 1920 |